(12) United States Patent
Emelyanov et al.

(10) Patent No.: US 10,248,449 B1
(45) Date of Patent: Apr. 2, 2019

(54) APPLICATION CONTAINERS RUNNING INSIDE VIRTUAL MACHINE

(71) Applicant: Parallels International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 259 days.

(21) Appl. No.: 15/390,857

(22) Filed: Dec. 27, 2016

(51) Int. Cl.
*G06F 9/50* (2006.01)
*G06F 9/455* (2018.01)

(52) U.S. Cl.
CPC ........ *G06F 9/45558* (2013.01); *G06F 9/5077* (2013.01); *G06F 2009/45583* (2013.01)

(58) Field of Classification Search
None
See application file for complete search history.

(56) References Cited

U.S. PATENT DOCUMENTS

2017/0371693 A1* 12/2017 Corrie ................ G06F 9/45558

OTHER PUBLICATIONS

Nagy, Gabor, "Operating Systems Containers vs. Application Containers" May 19, 2015, Rising Stack. (Year: 2015).*

* cited by examiner

*Primary Examiner* — Qing Yuan Wu
(74) *Attorney, Agent, or Firm* — Bardmesser Law Group

(57) ABSTRACT

System for launching application containers inside VMs without data duplication, includes first and second VMs on a host; a storage to which the host has access; a container generation module running on the host and configured to interface to VM-side container generation daemons in the VMs; the container generation daemons transmits to the container generation module a request to pull container layers; a host-side container generation daemon processes the request to pull the container layers from the container generation daemons running inside the VMs; and a DAX device residing on each of the VMs. The host container generation daemon sends the request for any missing container layers to a registry, and writes them onto the storage, maps the layers to the VMs as the DAX devices, maps all needed container layers to the first VM and maps any identical container layers to the second VM, without accessing the registry.

14 Claims, 7 Drawing Sheets

APPLICATION CONTAINERS RUNNING INSIDE VIRTUAL MACHINE

BACKGROUND OF THE INVENTION

Field of the Invention

The invention relates to a container virtualization, and, more particularly, to an efficient method for running the application containers inside Virtual Machines (VMs).

Description of the Related Art

The industry trend of virtualization and a use of application containers running inside of Virtual Machines (VMs) running on a physical host presents some challenges with regards to duplication of data and using redundant containers' files, etc.

If a user needs to run DOCKER or similar application-containers inside virtual machines (VMs), each application container requires a root file system. To make this file system, the DOCKER platform performs the following:

1. It downloads so called "layers" from a repository. For example, these layers can be:
   First, a distribution layer—it contains a minimal installation of a Linux™ distributive (e.g., Ubuntu);
   Then, a layer with some additional software. For example, additional libraries or a web server or a database engine, etc.;
   After that, an application layer—application binaries, resource files, default configurations, etc.
2. The application container is then configured—i.e., the configurations are added/modified. When creating the layers, the DOCKER platform (or other container generation module) typically snapshots a previous layer and then applies required changes (adds/removes/modifies files/directories) in this layer. An application container can have an arbitrary number of layers. In the conventional implementations, the following principles are used:
   All layers are transferred from a layers repository (also called "hub") to the server where the DOCKER platform is located. Since each layer (except for the first one) contains only the changes, an application container needs all layers for its operations;
   When downloaded, the layers are not merged together, so that different application containers that partially share layers only download the shared ones once;
   After image layers are downloaded, one more layer is created for storing application container changes to the file systems. This layer is an ephemeral one (i.e., it is removed upon application container stops) unless the changes are explicitly turned into another layer; and
   The resulting stack of layers is called a container root file system.

For example, there are two application containers with the same base layer. The application containers have different software and applications, but a single base image. As discussed above, the DOCKER platform will download the base layer only once, and it will download other layers and stack them for each application container. As a result, there will be the two stacks with the same base layer. Merging of the layers is implemented by using a Linux™ file system called Overlay FS (its previous implementation was called Union FS).

If there is a third application container, which has two identical lower layers with one of the two containers, a tree with three stacks of layers is created: all of them share the base layer, and two of them share the two lower layers. If there are several VMs (as in the example above) each with the DOCKER platform daemon running inside, and a user wants to run several containers in each of the VMs, even if all DOCKERs in all of the VMs run the same container, each of them has its own stack of layers. As a result, there are several VMs with the same (duplicate) disks and memory contents at the container's launch. This is inefficient and costly.

FIG. 1 illustrates a conventional approach to pulling application container layers using a registry. The host 100 is connected to the storage 110, which can be located on the host or can be connected to the host via Internet. Two VMs 120 and 130 are running under the host OS of the host 100. A DOCKER daemon (or other container generation daemon) runs inside each of the VMs (dockerd, 127). A request "pull container layers" comes to the dockerd 127. The dockerd 127 sends the request "pull layers" to the Docker registry 148 via the Internet. The Docker registry 148 stores the container layers and container-related metada. Then, the dockerd 127 gets the layers and puts them onto the virtual local storage 128.

The second VM 130 does the same after the dockerd 137 of the second VM 130 gets the request to "pull container layers." It goes to the registry and puts the data to the virtual local storage 138 of the second VM 130. Thus, both VMs 120 and 130 write the data (the layer, for example, an Ubuntu OS image, etc.) to their virtual local storages 128 and 138 respectively. The virtual storages do not contain the actual data, the virtual storages only represent data 118 and 119 from the physical storage 110 of the host. Thus, the data written to the virtual local storages 128 and 138 of the VMs 120 and 130 are stored on the physical storage 110 in different places (118 and 119). Therefore, the data is duplicated even if the pulled layers are identical.

Accordingly, it is desired to have an efficient method for running application containers inside the VM without duplication of data (click and cache duplication).

SUMMARY OF THE INVENTION

The invention relates to container virtualization, and, more particularly, to an efficient method for running the application containers (DOCKER or similar) inside Virtual Machines (VMs) without duplication of data, that substantially obviates one or more disadvantages of the related art.

In one aspect, a system for launching application containers inside Virtual Machines (VMs) without data duplication, includes first and second VMs running on a host; a host data storage to which the host has access; a container generation module running on the host and configured to interface to VM-side container generation daemons inside each of the VMs; the VM-side container generation daemons configured to transmit to the container generation module a request to pull container layers; a host-side container generation daemon configured to receive and process the request to pull the container layers from the container generation daemons running inside the VMs; and a direct access (DAX) device residing on each of the VMs. The host container generation daemon sends the request for any missing container layers to a registry, and writes these container layers onto the data storage. The host container generation daemon maps the container layers to the VMs as the DAX devices. The host container generation daemon maps all needed container layers to the first VM and maps any identical container layers to the second VM, without accessing the registry.

Optionally, the identical layers are identified by their name or identifier. Optionally, the identical layers are shared by the first and second VMs. Optionally, the generation module is a DOCKER module. Optionally, the VM-side container generation daemons and the host container generation daemon are DOCKER daemons. Optionally, the VM-side container generation daemons are configured to merge the container layers using an Overlay FS. Optionally, the VM-side container generation daemons are configured to mount NVDIMMs in execution in place (XIP) mode prior to the merging of the container layers. Optionally, the VM-side container generation daemons are configured to create a virtual container root files system after the merging of the container layers. Optionally, the VM-side container generation daemons are configured to merge the container layers using a file system that does not produce additional memory caching. Optionally, the registry is accessible by the host-side container generation daemon and is configured to store the container layers.

In a further aspect, a method, system and computer product for running application containers inside VMs without data duplication are provided. A first VM is running on a host; a second VM is running on the host; and the host has access to a data storage. A container generation module is running on the host and configured to interface to VM-side container generation daemons inside each of the VMs. The VM-side container generation daemons are configured to generate and transmit to the container generation module a request to pull container layers. A host-side container generation daemon is configured to receive and process the request to pull the container layers from the container generation daemons running inside the VMs. A direct access (DAX) device resides on each of the VMs. The host container generation daemon sends the request for any missing container layers to a registry, and writes these container layers onto the data storage. The host container generation daemon maps the container layers to the VMs as the DAX devices. The host container generation daemon maps all needed container layers to the first VM and maps any identical container layers to the second VM, without accessing the registry.

In a further aspect, a host-side DOCKER module can be changed so that it puts layers into image files. Then, these image files are given to VMs via DAX (direct access) devices. Then, the VM-side DOCKERs mount all their NVDIMMs in XIP (execution in place) mode and can see regular DOCKER layers, as if they were initially downloaded and written onto a local disk. Then, the VM-side DOCKER module merges layers together using Overlay FS or a similar FS that does not need to use caching.

Thus, when the DOCKER module inside the VMs starts an application container and this container starts addressing files from its file system, the new pages for the disk cache are not created and all VMs effectively share common layers not only on the disk (as layers are located on a host), but also in memory. As the data is read into memory on the host from the image file and is mapped into the VMs using DAX/XIP mechanism, the Overlay FS, advantageously, does not produce additional memory caching.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
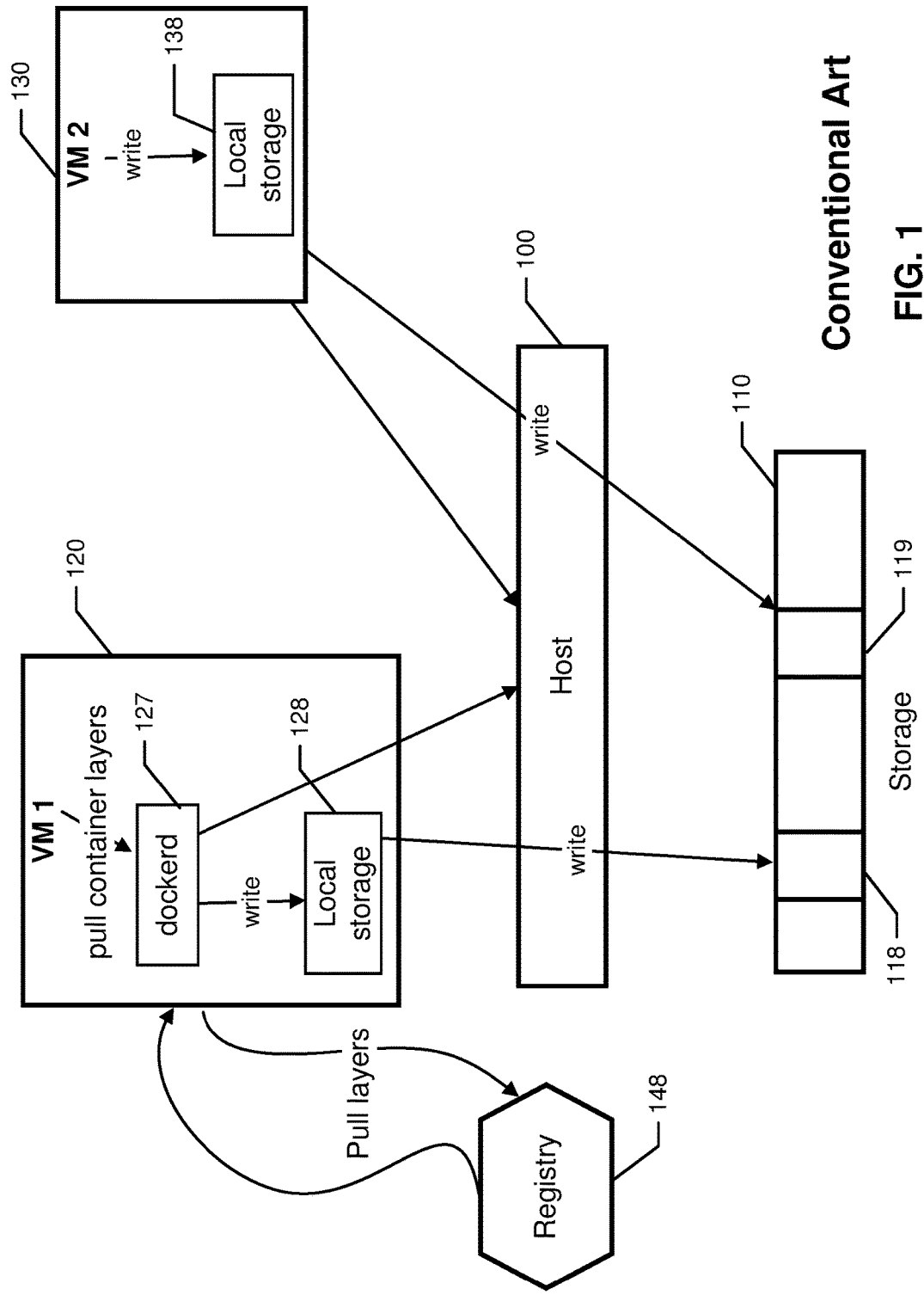
FIG. 1 illustrates a conventional approach to pulling application container layers using a registry.

Reference will now be made in detail to the preferred embodiments of the present invention, examples of which are illustrated in the accompanying drawings.

The following definitions are used throughout the description.

Virtual Execution Environment (VE), a type of environment that supports program code execution, where at least a part of the real hardware and software required for running program code are presented as their virtual analogs. From the point of view of the user, the code in Virtual Execution Environment runs as if it were running on the real computing system.

Virtual Machine (VM), a type of an isolated Virtual Execution Environments running on the same physical machine simultaneously. Each Virtual Machine instance executes its own OS kernel (a guest OS kernel). Support of Virtual Machines is implemented using a Virtual Machine Monitor and/or a Hypervisor.

Virtual Private Server (VPS) (also called Container, or OS Container), is one type of a Virtual Execution Environment running on the same hardware system with a single shared OS kernel and most of the system resources, where isolation of Virtual Execution Environments is implemented on the namespace level. A Virtual Private Server, often referred to as "Container," is a closed set, or collection, of processes, system resources, users, groups of users, objects and data structures. Each VPS/Container has its own ID, or some other identifier, that distinguishes it from other VPSs/Containers.

The VPS/Container offers to its users a service that is functionally substantially equivalent to a standalone server. From the perspective of an administrator of the VPS/Container, the VPS/Container acts the same as a dedicated computer at a data center with a remote access. For example, the administrator of the VPS/Container has the same remote access to the server through the Internet, the same ability to reload the server, load system and application software, authorize VPS/Container users, establish disk space quotas of the users and user groups, support storage area networks (SANs), set up and configure network connections and web servers, etc. In other words, the full range of system administrator functions is presented, as if the VPS/Container were a dedicated remote server, and the existence of the VPS/Container is transparent from the perspective of both the VPS/Container user and the VPS/Container administrator.

Application containers wrap a piece of software in a complete file system that contains everything needed to run: code, runtime environment, system tools, and system libraries—anything that can be installed on a server. This guarantees that the software will always run the same, regardless of its environment. Images are constructed from layered file systems and share common files, making disk usage and image downloads much more efficient. The application containers isolate applications from one another and the underlying infrastructure, while providing an added layer of protection for the application.

The present invention is directed to a method, system and computer product for implementing application containers inside the VM without duplication of data on disk and in cache. According to an exemplary embodiment, the following technologies are used:

Overlay FS (or similar) and RAM containing some data;

Intel™ technology called DAX (Direct Access) that creates a file on the server, which appears in the Guest OS as a NVDIMM device;

a file system working in XIP (execute in place) mode: it "knows" that it works on a NVDIMM device, which is residing on the RAM and not on a disk, and it does not create a disk cache.

According to the exemplary embodiment, a host-side container generation module (for example DOCKER module, a Parallels™ container, LXC from Canonical™ ContainerD from OCI Community, etc.) is created so that it stores layers on the host storage (e.g. into image files). These image files are given to VMs as DAX devices. Then, the VM-side container generation modules (e.g., DOCKERs mount all their Non-Volatile Dual In-line Memory Modules (NVDIMMs) in XIP mode, and can see regular application container layers, as if they were initially downloaded and written onto a local disk. Then, the VM-side container generation module merges layers together using Overlay FS.

Thus, when the container generation module inside the VMs starts an application container and this container starts addressing files from its file system, new pages for the host disk cache are not created and all the VMs effectively share common layers not only on the disk (as layers are located on a host), but also in host memory. As the data is read into memory on the host from the image file and is mapped into the VMs using DAX/XIP mechanism, the Overlay FS does not produce additional memory caching. This solves the data duplication problem not only in disk but also in cache.

According to the exemplary embodiment, if the container generation module (e.g., DOCKER or similar) can be patched correctly, the layers from which root file systems of application containers consist can be shared across the VMs as effectively as if there were no VMs.

Figure 2:
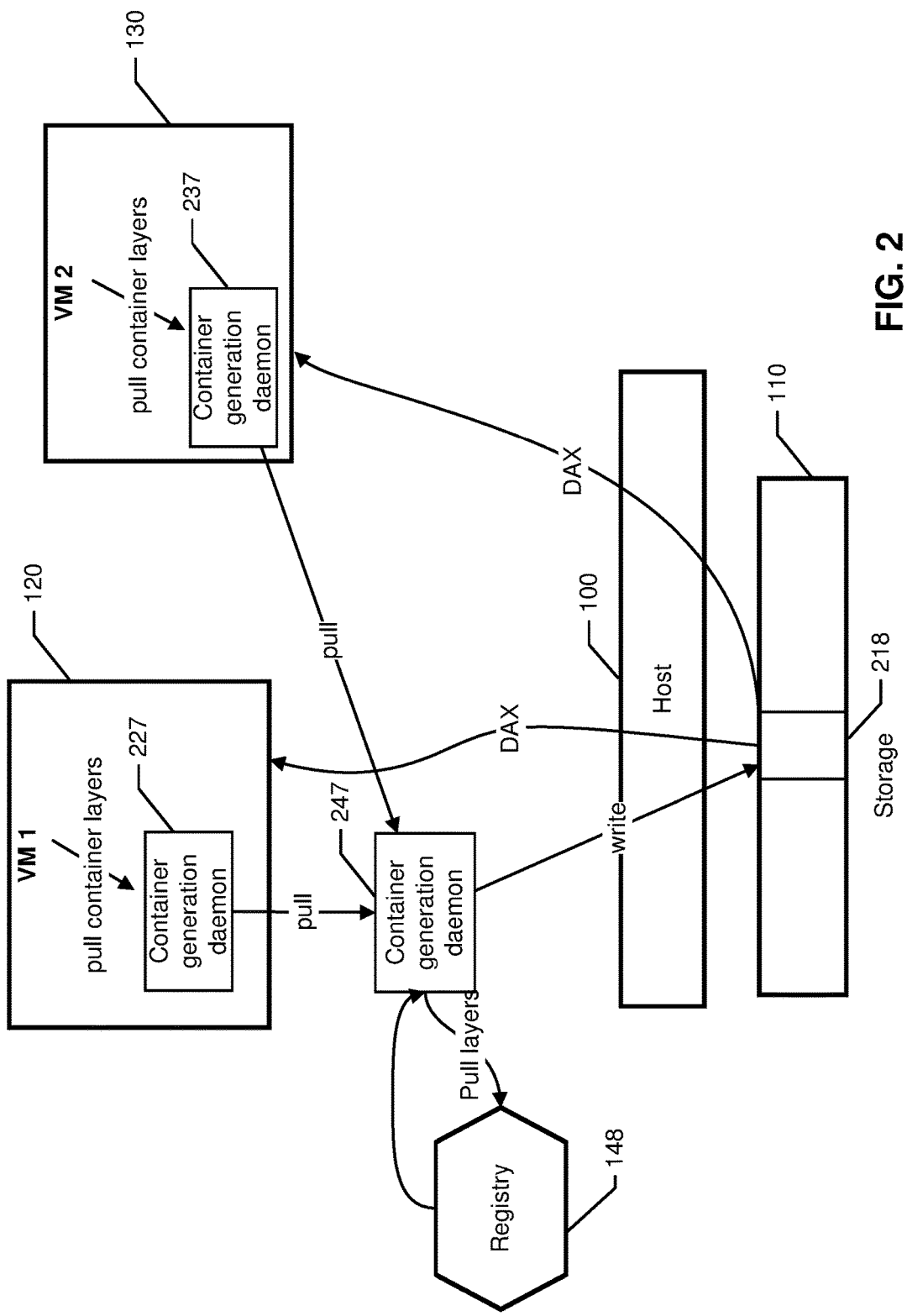
FIG. 2 illustrates pulling application container layers, in accordance with the exemplary embodiment.

FIG. 2 illustrates pulling application container layers, in accordance with the exemplary embodiment. In FIG. 2, the host 100 uses a data storage 110 to which the host has access=(e.g. the storage can be located on the host or be connected to the host via Internet). Two VMs 120 and 130 are running on the host 100. Container generation daemons (on the figure Docker daemons are shown) (dockerds 227 and 237) run inside the respective VMs 120 and 130. In this example, a request "pull container layers" comes to the dockerds 227 and 237. Then, the request is redirected to the dockerd 247, which is running on the host 100. Now, instead of the dockerd 227 of the VM 120, the dockerd of the host 247 sends the request pulls layers from a registry 148. The host container generation daemon (on the figure Docker daemon 247 is shown) reads the needed layers and puts them on its local storage 218 residing on the host storage 110. Then, the host dockerd 247 maps the layers to the VM 120.

The second VM 130 (if it exists in the system, and any other VM, which are not shown on the picture) behaves in the same manner. When the request "pull container layers" comes to the dockerd 237 of the VM 130, the request is redirected to the host dockerd 247. If the layers are identical, the host container generation daemon 247 does not need to pull them from the registry one more time. The host container generation daemon 247 just finds the layers on the local storage 218, because the layers have already been downloaded while processing the request of the VM 120. Then, the host docker daemon 247 maps the layers stored on the local storage 218 to the second VM 130 using a DAX (direct access) device. Consequently, all the layers needed to the VMs 120 and 130, advantageously, exist on the host storage 210 in only one instance 218. This solves the data duplication problem depicted in FIG. 1.

Figure 3:
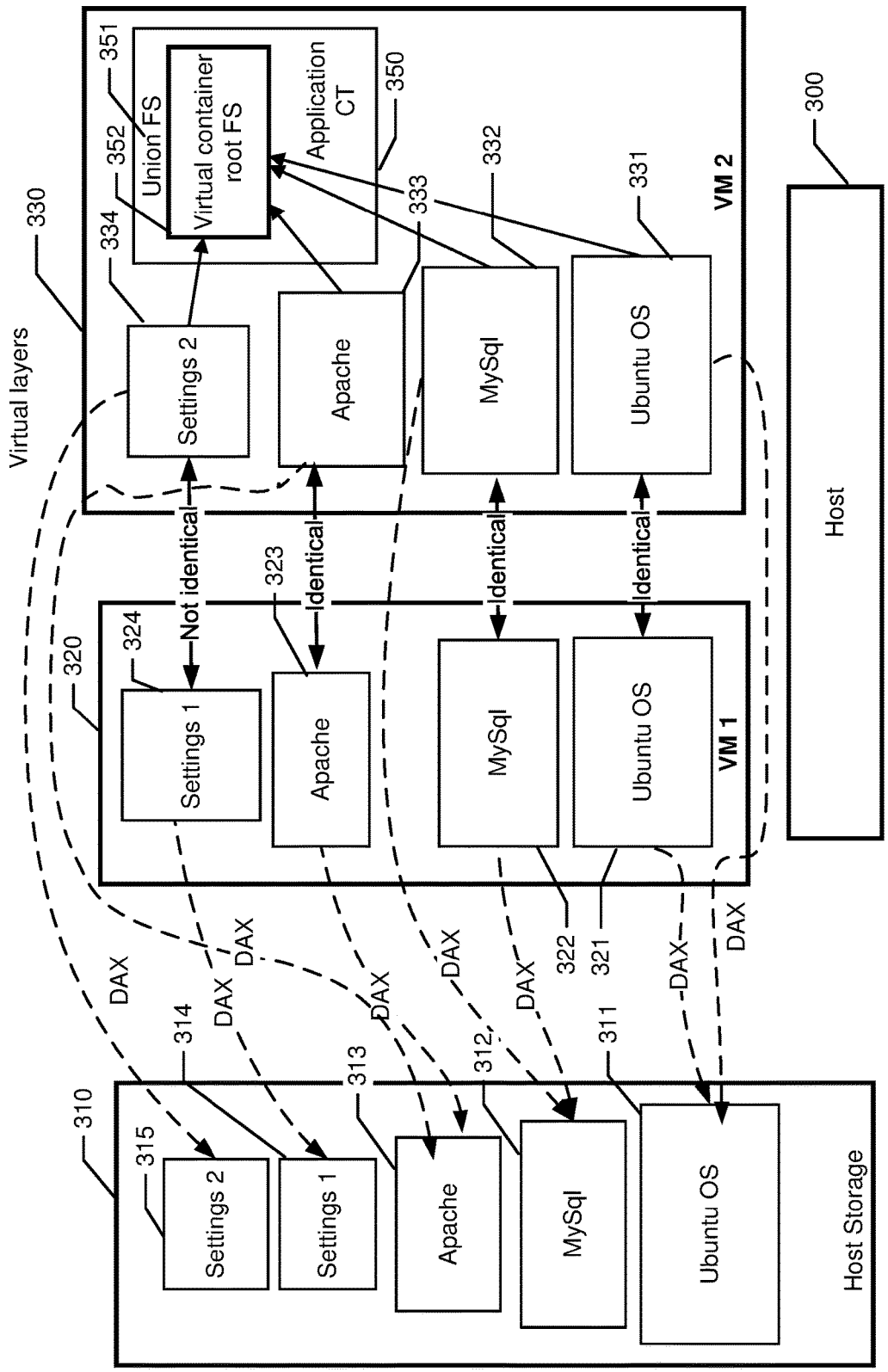
FIG. 3 illustrates a system for starting the application containers inside the Virtual Machines (VMs), in accordance with the exemplary embodiment.

FIG. 3 illustrates a system for starting the application containers inside the Virtual Machines (VMs), in accordance with the exemplary embodiment. A host 300 has two VMs (320 and 330) running on it. A storage 310 (so called host storage, to which the host has access) is used for storing the layers. The storage 310 can be located on the host or can be available to the host over a network. Each of the VMs has a set of layers (mapped to VM using DAX) required for launching an application container. The layers 321-324 and 331-334 are virtual—i.e., they do not have their own storage for the layers' data. The data is imported from the storage 310. The VMs have a special file system, which stores data on a virtual disk which is mapped to a host image file, and does not generate an additional disk cache. The layers in the VMs (320 and 330) are mapped to the layers in the storage 310 using DAX (direct access) device.

The virtual layers (331-334) in the second VM 330 are united by the Union FS 351 (or any file system capable to unite different layers into application container root file system) and form the application container root FS 352 of the application container 350 that should be launched inside the VM 330. The Union FS (in its more modern incarnation, the Overlay FS) or similar is used, because these file systems can assemble application container layers without showing other layers except for the top one, with only one shared cache from common layers used for all containers. Other file systems, such as NTFS, which don't support all the relevant features, can be modified for the purpose.

The four layers (331-334) are presented in the VM 330 using a DAX device. The VM unites the layers and starts the application container 350. The layers (321 and 331, 322 and 332, 323 and 333) that are identical in both of the VMs (320 and 330) are stored in the storage 310 in one instance (see layers 311, 312 and 313). The other layers (324 and 334) are not identical, and both of them (314 and 315) are stored in the storage 310.

For example, the storage 310 contains only one layer 311 called "Ubuntu OS," which is mapped to both VMs (320 and 330). However, the storage 310 contains two layers (314, 315) called "Settings," each mapped to the corresponding VM. Thus, FIG. 3 illustrates the mapping of the layers between the storage 310 and the VMs 320 and 330. FIG. 3 also illustrates a general scheme of how the layers are used for starting application containers inside the VMs.

According to the exemplary embodiment, the behavior of the container generation daemon in the VMs is changed, so that the daemon does not send requests to the registry, but redirects the requests to the host container generation daemon. In this case, the container generation daemons of different VMs do not create different storages of the layers, but use one shared storage located on the host, as illustrated in FIG. 2. Then, the layers are mapped to the VMs using the DAX device. The layers are united inside the VM by the Union FS and form the application container root FS, on which the application container can be started as illustrated in FIG. 3.

According to the exemplary embodiment, only one instance of the required application container layers are stored on the host. However, if the layers are transferred to the VMs by conventional means—e.g., Virt IO or disk emulation, this will result in duplicate pages in the disk cache. Using the DAX device, the disk cache duplication is avoided (as shown in FIG. 4).

Figure 4:
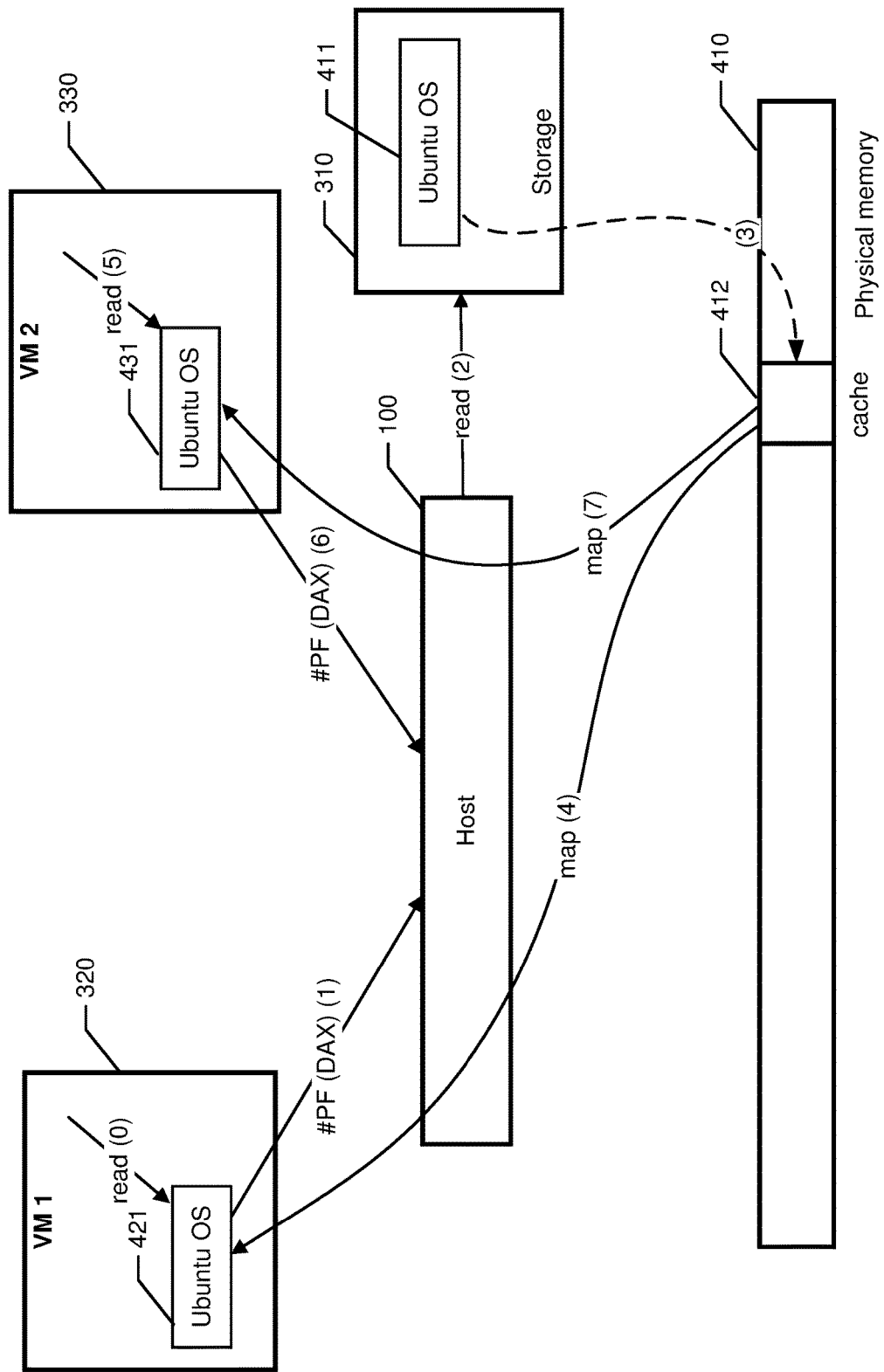
FIG. 4 illustrates operations with physical memory, in accordance with the exemplary embodiment.

FIG. 4 illustrates physical memory usage, in accordance with the exemplary embodiment. The host 100 is connected to the storage 310 (e.g. the storage can be located on the host or connected to is via Internet). At least one VM is running on the host. On the FIG. 4 two VMs: VM 320 and VM 330 are shown. Each of the VMs has a layer (421, 431) called "Ubuntu OS." The layer "Ubuntu OS" 411 from the storage 310 is represented in the VM 1 (420) using DAX device (see "Ubuntu OS" 421). When the VM 1 (420) tries to read the data from "Ubuntu OS" 421, the page fault (#PF) can occur. The Guest OS generates a page fault if read/write operations are directed to the DAX while the corresponding DAX physical memory is not yet allocated for the DAX area where the read/write is directed to. Then, the host 100 processes the page fault. The host reads data from the storage 310 and caches it in the host physical memory 410 in some physical pages 412. Then, the host 100 maps the pages 412 to the VM 1 (320). Now the VM 1 (320) does not need to cache the data, so the there are no cached duplicates of the same image. The second VM (330) behaves in the same manner.

When the VM 2 (330) tries to read data from the layer called "Ubuntu OS," and the page fault #PF occurs, the host 100 processes the page fault. Because the images 421 and 431 are identical, and because the host 100 has already cached the required data (while processing the page fault of VM 1), the host 100 does not need to read the data from the storage 310 one more time. The host 100 finds the data in the cache 412. Then, the host 100 maps the cached pages 412 to the second VM 330. The second VM 330 does not cache the pages. Note that the disk emulation used in the conventional system does not have to be replaced by the DAX device, mapped to both VMs 320 and 330. Thus, the data is not duplicated in the host physical memory 410 anymore.

Figure 5:
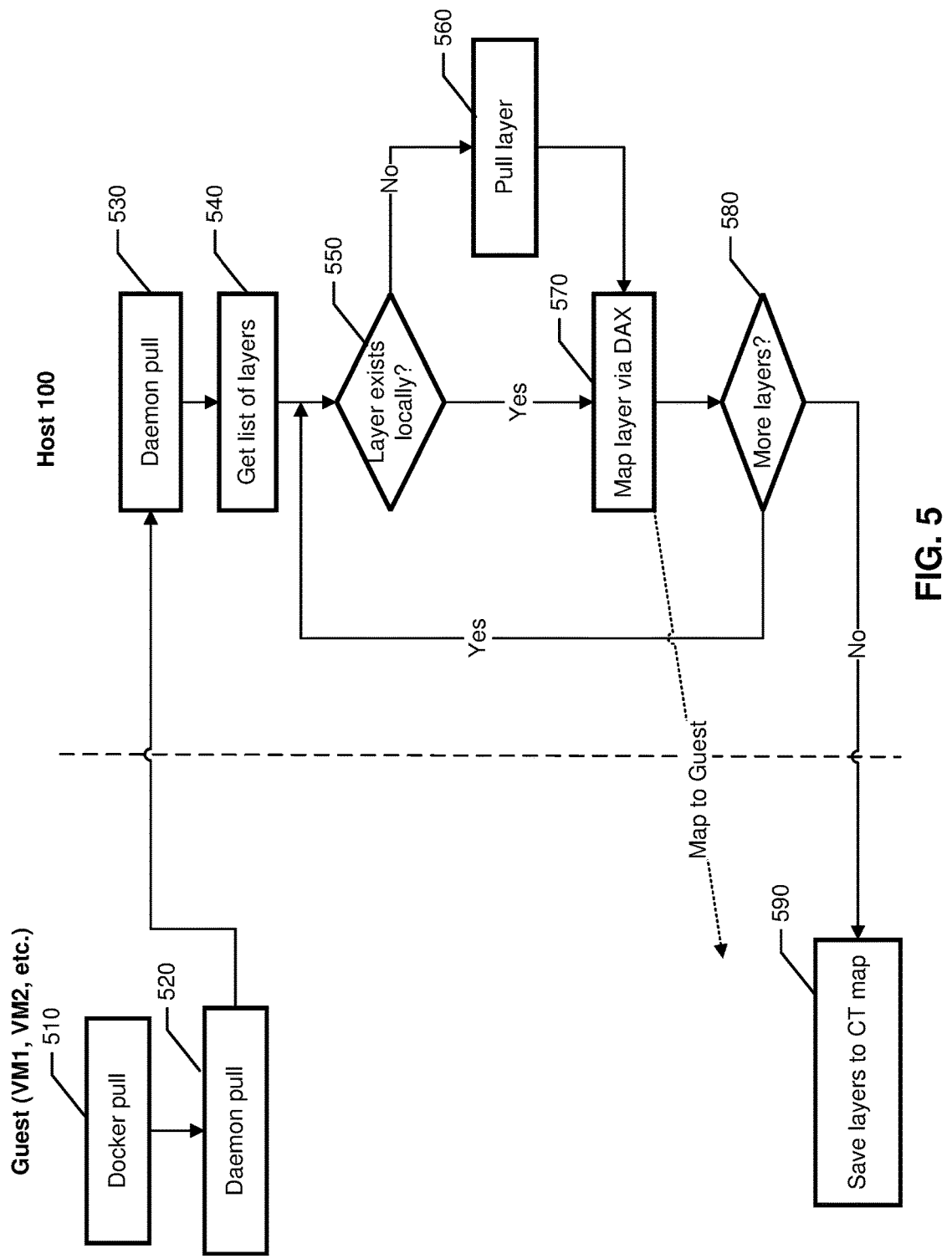
FIG. 5 illustrates a flowchart of a method for pulling application container layers, in accordance with the exemplary embodiment.

FIG. 5 illustrates a flowchart of a method for pulling application container layers, in accordance with the exemplary embodiment. In step 510, a pull request occurs in a Guest OS. In step 520, a daemon pull request begins to be executed on the Guest OS and is transferred to a host-side container generation daemon for completion, where a daemon pull request is executed in step 530. A list of application container layers is acquired in step 540. If a layer exists locally in step 550, the process maps the layer via DAX device to VM (i.e., Guest OS) and checks for more layers in step 580. If more layers exist, the process goes back to step 550. Otherwise, the layers are saved into a container map (i.e., a set of configuration files that defines what layers are required) on the host in step 590. (The same process occurs when the pull request is received from both the VM and from host side utilities.) If a layer does not exist locally in step 550, the layer is pulled from registry in step 560 and then mapped via a DAX device in step 570.

Figure 6:
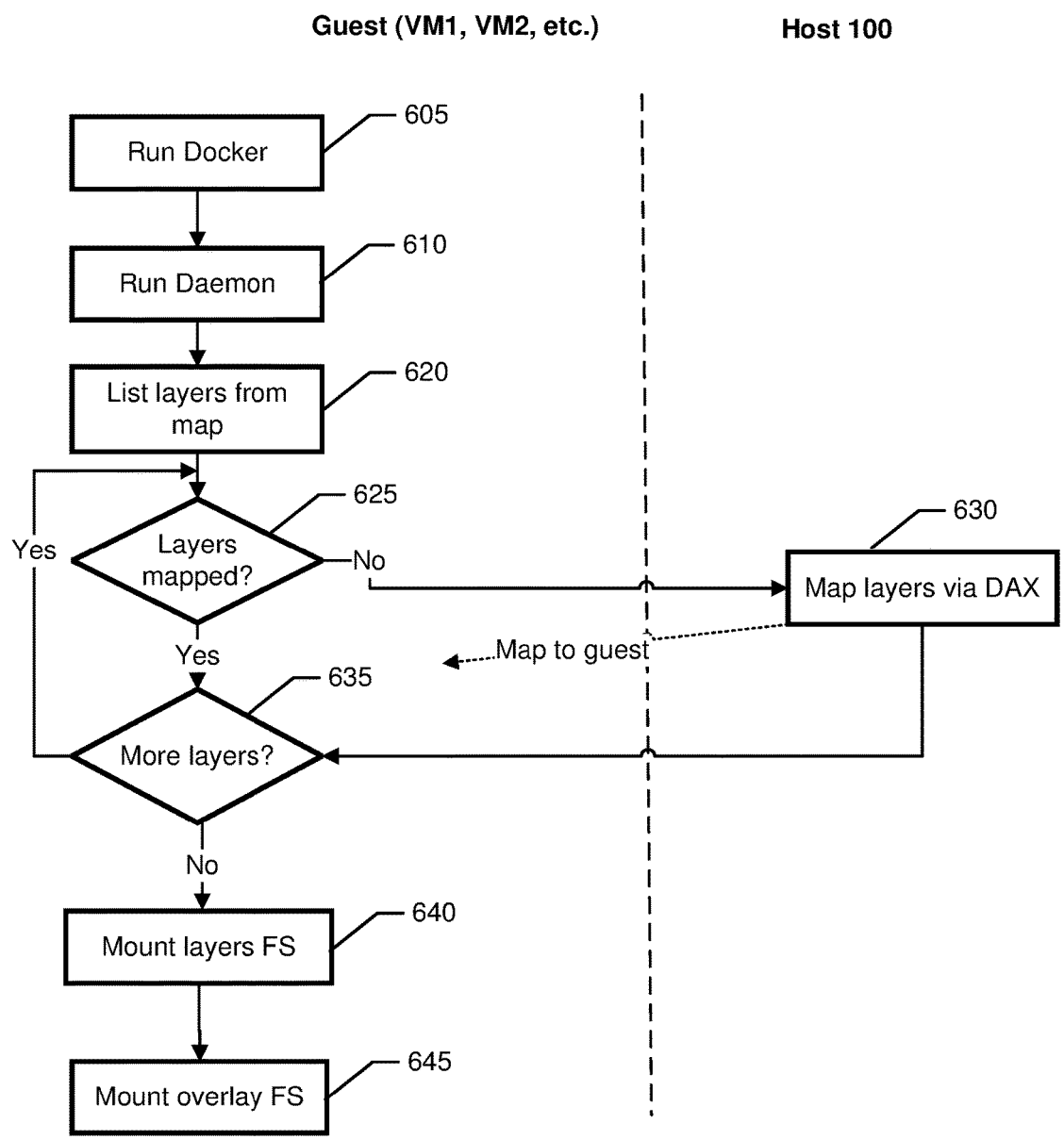
FIG. 6 illustrates a flowchart of a method for mounting container Overlay FS file system layers, in accordance with the exemplary embodiment.

FIG. 6 illustrates a flowchart of a method for mounting container overlay FS layers, in accordance with the exemplary embodiment. The process runs a container generation module on a Guest OS in step 605. In step 610, the daemon is run. The process lists container layers from a map in step 620. If a layer is mapped in step 625, the process checks for more layers in step 635. If a layer is not mapped, the process maps the layer via DAX on a host side in step 630 and checks for more layers in step 635. If more layers are found in step 635, the process goes back to step 625. Otherwise, the layers are mounted to a file system (FS) in step 640 and an overlay FS is mounted in step 645.

Figure 7:
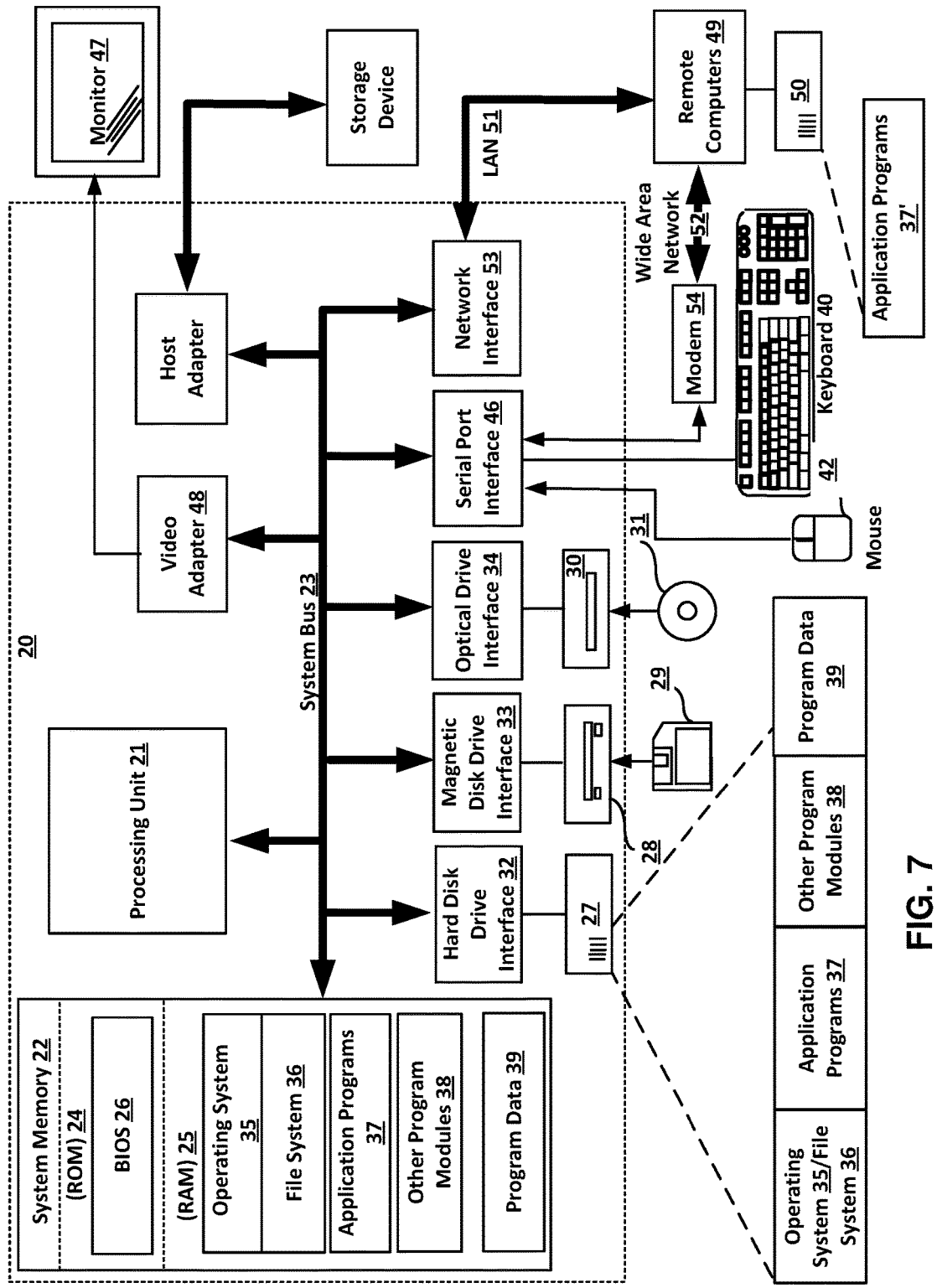
FIG. 7 illustrates a computer system or a host server, which can be used in the exemplary embodiment.

With reference to FIG. 7, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for launching application containers inside Virtual Machines (VMs) without data duplication, the system comprising:
    a first VM running on a host;
    a second VM running on the host;
    a data storage to which the host has access;
    a host-side container generation daemon running on the host and configured to interface to VM-side container generation daemons inside each of the VMs;
    the VM-side container generation daemons configured to transmit to the host-side container generation daemon requests to pull container layers;
    the host-side container generation daemon is configured to receive and process the requests to pull the requested container layers from the VM-side container generation daemons; and
    a direct access (DAX) device residing on each of the VMs, wherein:
    the host-side container generation daemon sends a request for any container layers that have not yet been pulled in prior requests, to a registry, and writes these container layers onto the data storage;
    the host-side container generation daemon maps all the pulled container layers to the VMs as the DAX devices; and
    the host-side container generation daemon maps all needed container layers to the first VM and also maps identical container layers that are identical to both the first and second VMs to the second VM, without accessing the registry.

2. The system of claim 1, wherein the identical layers are identified by their name or identifier.

3. The system of claim 1, wherein the identical layers are shared by the first and second VMs.

4. The system of claim 1, wherein the VM-side container generation daemons and the host-side container generation daemon are DOCKER daemons.

5. The system of claim 1, wherein the VM-side container generation daemons are configured to merge the container layers using an Overlay FS.

6. The system of claim 5, wherein the VM-side container generation daemons are configured to mount NVDIMMs in execution in place (XIP) mode prior to the merging of the container layers.

7. The system of claim 5, wherein the VM-side container generation daemons are configured to create a virtual container root files system after the merging of the container layers.

8. The system of claim 1, wherein the VM-side container generation daemons are configured to merge the container layers using a file system that does not produce additional memory caching.

9. The system of claim 1, wherein the registry is accessible by the host-side container generation daemon and is configured to store the container layers.

10. A method for launching application containers inside Virtual Machines (VMs) without data duplication, the method comprising:
    launching a first VM and a second VM on a host, wherein each VM has a direct access (DAX) device;
    starting a host-side container generation module on the host;
    launching VM-side container generation daemons inside the VMs by the container generation module;
    starting a host-side container generation daemon running on the host and configured to interface to VM-side container generation daemons inside each of the VMs;
    wherein the VM-side container generation daemons are configured to generate and transmit to the host-side container generation daemon requests to pull container layers; and
    wherein the host-side container generation daemon is configured to receive and process the requests to pull the requested container layers from the VM-side container generation daemons,
    wherein:
        the host-side container generation daemon sends a request for any container layers that have not yet been pulled in prior requests, to a registry, and writes these container layers onto the data storage;
        the host-side container generation daemon maps all the pulled container layers to the VMs as the DAX devices; and the host-side container generation daemon maps all needed container layers to the first VM and also maps identical container layers that are identical to both the first and second VMs to the second VM, without accessing the registry.

11. The method of claim 10, wherein the VM-side container generation daemons and the host-side container generation daemon are DOCKER daemons.

12. The method of claim 10, further comprising mounting Non-Volatile Dual In-line Memory Modules in execution in place (XIP) mode prior to merging of any shared container layers.

13. The method of claim 10, further comprising creating a virtual container root file system after merging of the container layers on the VMs.

14. A computer program product comprising a non-transitory computer readable medium containing code for implementing the steps of claim 10.

* * * * *